(12) United States Patent
Gautvik

(10) Patent No.: US 6,311,686 B1
(45) Date of Patent: Nov. 6, 2001

(54) COOKING APPARATUS

(76) Inventor: Willy Gautvik, P.O. Box 2355 Solli, N-0201 Oslo (NO)

( * ) Notice: Subject to any disclaimer, the term of this patent is extended or adjusted under 35 U.S.C. 154(b) by 0 days.

(21) Appl. No.: 09/623,875
(22) PCT Filed: Mar. 4, 1999
(86) PCT No.: PCT/NO99/00076
§ 371 Date: Sep. 11, 2000
§ 102(e) Date: Sep. 11, 2000
(87) PCT Pub. No.: WO99/46541
PCT Pub. Date: Sep. 16, 1999

(30) Foreign Application Priority Data

Mar. 9, 1998 (NO) .................................................... 981034

(51) Int. Cl.$^7$ .................................................. A47J 36/26
(52) U.S. Cl. ........................ 126/373.1; 126/40; 126/265
(58) Field of Search ................... 126/40, 373.1, 126/261, 265, 256, 258, 50, 9 R; 431/344, 203

(56) References Cited

U.S. PATENT DOCUMENTS

| 2,154,305 |   | 4/1939 | Goerl . |  |
|---|---|---|---|---|
| 2,756,738 | * | 7/1956 | Kratz | 126/265 |
| 3,140,740 | * | 7/1964 | Lagreid et al. | 431/344 |
| 5,408,987 | * | 4/1995 | Mifune et al. | 126/373.1 |
| 5,513,623 | * | 5/1996 | Hong | 126/40 |
| 5,651,356 |   | 7/1997 | Kaines . |  |

FOREIGN PATENT DOCUMENTS

WO 93/05344    3/1993    (WO) .

* cited by examiner

Primary Examiner—Sara Clarke
(74) Attorney, Agent, or Firm—Young & Thompson

(57) ABSTRACT

A cooking apparatus comprising a burner (2) and a cylindrical casing (10) which is arranged round the burner and extends upwardly therefrom. A cooking vessel (40) may be placed in the casing (10), its upper portion hanging on the casing's upper edge. On the cooking vessel there is placed a lid (50) which rests on the cooking vessel (40). In the upper portion of the casing (10) there are provided therein radially through-going openings (32). The lid (50) has a through-going hole and between the lid (50) and the cooking vessel (40) there extend passages (66) via which the space outside the casing (10) can communicate with the space (82) in the cooking vessel (40). A tubular jacket (70) of a fireproof, flexible material extends over the lid (50) and on the outside of the casing (10). The jacket has a lower opening (72), whose edge is arranged to sealingly enclose a lower portion of the casing (10), and an upper opening (74) whose edge is arranged for sealing connection with the edge of the lid's hole (60).

11 Claims, 1 Drawing Sheet

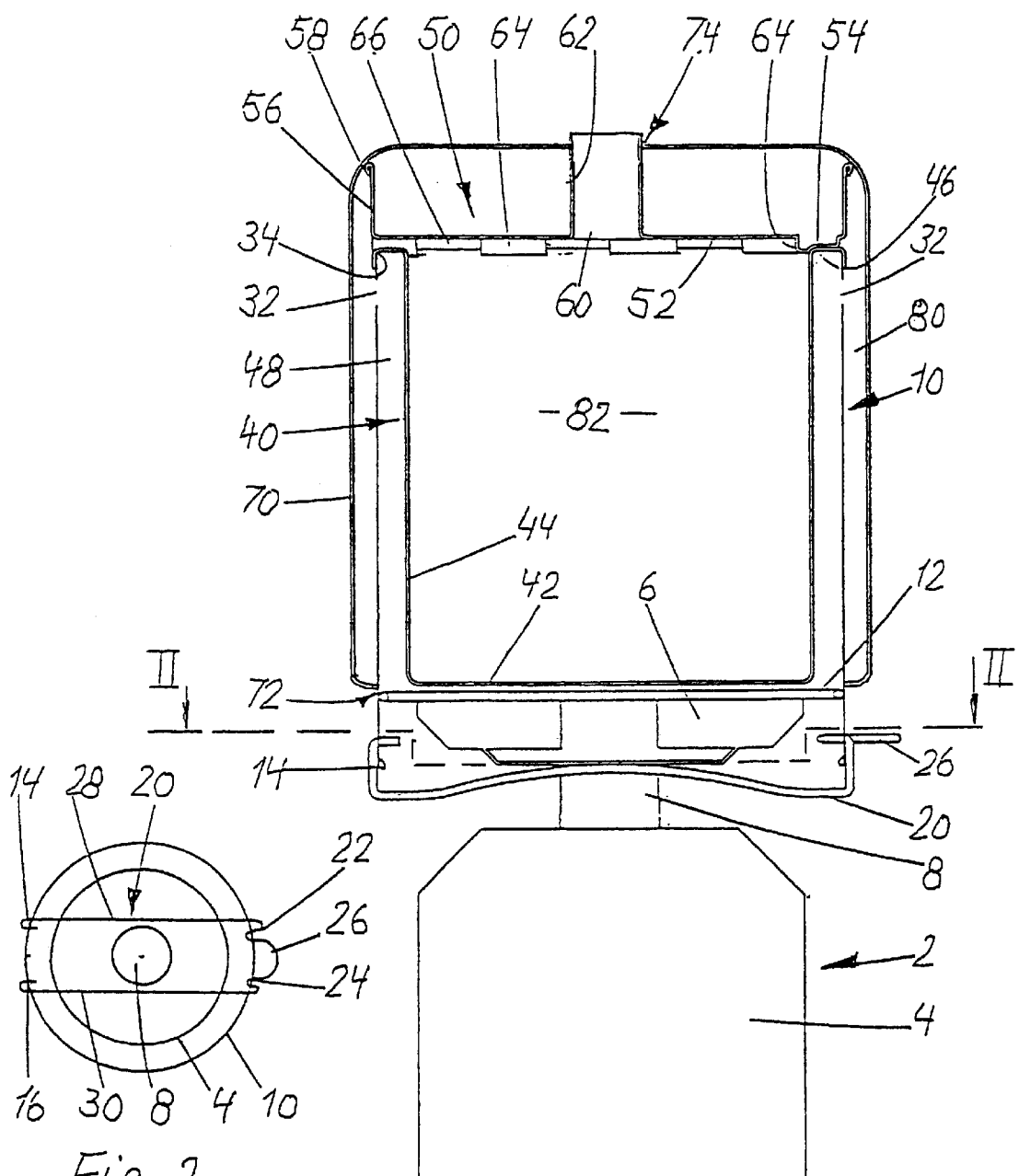
Fig. 1
Fig. 2
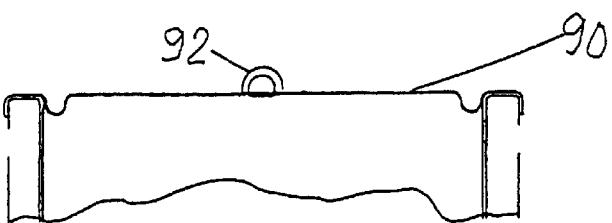
Fig. 3

COOKING APPARATUS

FIELD OF THE INVENTION

The invention relates to a cooking apparatus comprising a burner an upwardly extending cylindrical casing in the lower part of which is a radially inwardly projecting, first contact portion and in the upper part a first edge, a cylindrical cooking vessel which has a bottom, a side wall which extends upwardly from the bottom, and in the upper part has a radially outwardly projecting, second contact portion, the bottom and the side wall defining a space in the vessel, and a lid with a peripheral portion which is arranged to rest on the cooking vessel's second contact portion, where the casing's first contact portion is arranged to rest on the burner, and the casing is arranged to enclose the cooking vessel's side wall in such a manner that between the casing and the cooking vessel there is formed a gap, the cooking vessel's second contact portion is arranged to abut against the casing's first edge, and at the point where the cooking vessel's second contact portion abuts against the casing's first edge there are provided radially extending openings via which the gap can communicate with the space outside the casing when the cooking vessel is disposed in the casing.

BACKGROUND OF THE INVENTION

From U.S. Pat. No. 2,756,738 there are known cooking apparatuses or kits of the above-mentioned type where the hot gas which is provided by the burner is caused to flow upwards between the burner and the bottom of the vessel and radially outwards therefrom along the bottom towards the lower portion of the casing. This lower portion of the casing deflects the gas there, thus causing it to flow up through the gap between the cooking vessel and the casing and out into the ambient open air through openings in the casing's upper portion. The object is thereby achieved that the heat energy in the gas is exploited to a great extent for heating the contents of the cooking vessel. However, the casing is made of a thin metal sheet and emits a large amount of heat radiation.

From the prior art it is also know that the casing is made of metal and has double walls which define an annular space wherein a heat-insulating material may be placed.

When using the cooking apparatus the object is thereby achieved that the temperature of the casing's outer surface may be low and that the casing emits only a small amount of heat radiation which may betray its position, a factor which can be important in military use of the cooking vessel, but the double metal walls cause the cooking apparatus to be relatively heavy. The lid closes the cooking vessel at the top.

SUMMARY OF THE INVENTION

The advantages of the invention are that the lid has a hole via which the space in the cooking vessel can communicate with the space above the lid, and between the peripheral portion of the lid and the second contact portion of the cooking vessel there extend passages via which the space outside the casing can communicate with the space in the cooking vessel when the lid is placed on the cooking vessel, and the cooking apparatus further comprises a tubular jacket of a fireproof, flexible material, which is arranged to extend over the lid and with clearance relative to and outside the casing, and which has a lower opening whose edge is arranged to sealingly enclose a lower portion of the casing, and an upper opening whose edge is arranged for sealing connection with the edge of the lid's hole.

The object is thereby achieved that at the gap between the casing's side wall and the jacket there is formed an insulating air space which provides heat insulation, thus causing the jacket's temperature to be low when the cooking apparatus is in use and thus enabling the wall of the casing to be formed by a single plate, thus reducing the cooking vessel's weight, since the jacket can be relatively light.

The object is further achieved that the hot gas which has flowed upwards along the cooking vessel and the casing and radially out through the openings at the point where the cooking vessel abuts against the casing can flow radially inwards through the openings between the peripheral portion of the lid and the upper edge of the cooking vessel, under the lid and out through the hole in the lid.

The heat energy of the gas which flows radially outwards through the openings at the contact point between the cooking vessel and the casing is thereby utilised for further heating of the contents of the cooking vessel before the gas finally flows out through the hole in the lid.

If the burner is sufficiently small relative to the cooking vessel, it can be placed after use in the cooking vessel, the jacket being tied round the cooking vessel, thereby keeping the components of the cooking apparatus together.

If the lid is in the form of an upwardly open vessel with a bottom and extending from a circumferential portion thereof a cylindrical side wall with a second upper edge, where the hole is provided in the bottom and from the hole there extends upwardly a pipe connected with the bottom sealingly round the hole, the length of which pipe is at least as great as the height of the lid's side wall, and the bottom comprises the peripheral portion which is arranged to abut against the cooking vessel's second contact portion, the edge of the jacket's upper opening being arranged to sealingly enclose the pipe's upper portion, the lid can also be utilised for, e.g., heating of food or thawing of ice, etc.

BRIEF DESCRIPTION OF THE DRAWINGS

The invention will now be described in more detail with reference to the drawing which schematically illustrates an embodiment of a cooking apparatus according to the invention.

FIG. 1 shows a vertical longitudinal section through the cooking apparatus according to the invention.

FIG. 2 shows a section along line II—II in FIG. 1.

FIG. 3 shows a vertical longitudinal section through an upper portion of a cooking apparatus.

DETAILED DESCRIPTION OF THE INVENTION

In FIG. 1 there is illustrated a burner 2 which comprises a fuel tank 4 with a liquid or gaseous fuel which is under pressure, and a burner head 6 which is connected to a pipe 8 with a shut-off valve (not shown) for the fuel. This burner 2 may be a burner which is on the market.

A tubular, preferably circular cylindrical casing 10 rests with a radially inwardly extending, first contact portion 12 on the burner head 6 and extends upwardly therefrom, with a lower portion of the casing enclosing the burner head 6. The contact portion 12 may comprise a number of radial fingers extending at intervals, a flange with a number of through-going holes or a circular grating, or the like.

For securing the casing on to the burner head 6, there may be employed, for example, a securing device as illustrated in FIG. 2. This comprises a substantially U-shaped hoop 20 made of a strong metal wire. The free ends 14, 16 of the hoop's legs 28, 30 are bent or folded and arranged for insertion from the outside of the casing in respective holes which are provided near each other on one side of the casing. Near the hoop's bottom portion each leg 28, 30 has an S-shaped portion 22, 24, one loop of which is similarly arranged for insertion from the outside of the casing in respective holes on the approximately diametrically opposite side of the casing 10. A large loop 26 which connects the S-shaped portions 22, 24 can be gripped by the user with a finger and pulled away from the casing in order thereby to bring the said loops of the S-shaped portions in or out of their holes in the casing in order to affix the hoop or remove it. The legs may be caused to extend on each side of the pipe 8 and abut resiliently against the underside of the burner head, thereby securely fixing the casing on the burner head.

Instead of the loops at the free ends of the legs and the S-shaped portions 22, 24 extending radially into holes in the casing, it will be understood that the hoop may be designed in such a way that they extend radially outwardly, into the holes. Furthermore, a securing device may be provided so that it grips other portions of the casing.

In the upper part of the casing there may be a number of through-going holes 32 extending at intervals, and an upper, first edge 34.

A cooking vessel 40 comprises a, e.g., circular bottom 42, whose diameter is slightly smaller than the inner diameter of the casing 10, a side wall 44 which projects up from the bottom 42, and a second contact portion 46, which at the upper portion of the casing 10 projects radially outwards from the side wall 44. This contact portion 46 may be a radially and circumferentially tight or impervious flange. Alternatively, the flange may have a number of axially extending, through-going holes (not shown) or the contact portion may be formed from radially extending fingers which are arranged at intervals along the circumference of the cooking vessel's side wall, in which case no radially through-going holes 32 need to be provided in the casing's upper portion.

The cooking vessel may be inserted in the casing from above, its contact portion 46 being brought to rest on the casing's upper edge 34. The cooking vessel's bottom 42 then extends a short distance above the casing's contact portion 12.

Between the casing 10 and the cooking vessel's side wall 44 there is thus provided a gap 48.

A vessel-shaped, first lid 50 for the cooking vessel comprises a bottom 52, whose peripheral portion 54 is adapted to the shape of the vessel's second contact portion 46, and which is arranged to abut against it. Up from the lid's peripheral portion there extends a side wall 56, the upper portion of which is terminated by an upper, second edge 58. In the centre of the lid's bottom 52 there is provided a hole 60. A pipe 62 extends up from the bottom, its lower portion being sealingly connected to the portion of the bottom round the hole 60. The pipe's upper end portion is located approximately at the level of the upper, second edge 58 or slightly above this level. The bottom's peripheral portion 54 may have a number of downwardly projecting beads or depressed portions 64 arranged at intervals and forming downwardly open channels.

This lid is arranged to be placed on the cooking vessel in such a manner that its peripheral portion 54 rests on the cooking vessel's second contact portion 46. The beads 64 together with the second contact portion 46 thereby define passages 66 which connect a space 80 radially outside the casing and the lid with the space 82 which is defined by the lid 50 and the cooking vessel's side wall 44.

A tubular jacket 70 which is made of a fireproof, soft material, has on its inside a lower opening 72 whose edge is arranged to sealingly enclose a lower portion of the casing 10, and an upper opening 74, whose edge is arranged for sealing connection with the upper portion of the pipe 62, which can be passed into the opening 74. At the edge of the openings there may be provided, e.g. sewn, a seam in which a string is threaded, which when tightened can cause the jacket to sealingly enclose the casing and the pipe. This jacket 70 is preferably made of a material which, when it is hot, emits only a very small amount of heat radiation, thus making it difficult to locate the cooking vessel. The jacket may therefore be made of, e.g., a fabric of glass or Kevlar, a synthetic fiber, and it may be coated on the inside and/or the outside with a reflecting material such as aluminium. When the jacket is placed on the lid and the casing, the jacket extends over the upper, second edge 58 of the lid 50. Between the jacket 70 and the casing 10 there is thus defined an annular space 80.

When the cooking apparatus is in use combustion air can flow into the burner head 6 from below, where it is mixed with fuel flowing into it via the pipe 8 from the container 4. This air/gas mixture is burnt under the cooking vessel's bottom 42 and flows radially outwards along it towards the casing's cylindrical portion and up between the cooking vessel's side wall 44 and the casing. At the casing's upper portion the hot combustion gases flow out through the openings 32 and into the space 80 defined by the jacket and the casing. There they are deflected and flow into the space 82 under the lid 50 via the passages 66. From here they flow out in to the open, ambient air via the opening 60 and the pipe 62.

It will be understood that by means of the illustrated or another suitable securing device the casing can be attached easily and quickly to burners of different makes which are on the market, and the securing devices can be adapted thereto. The burner may preferably be placed in the cooking vessel when the cooking apparatus is not in use, and the jacket may hereby be tightened under the casing, with the result that all the components of the cooking apparatus are assembled and take up little space.

It will be understood that the lid does not need to be in the form of a vessel. It may, e.g., be in the form of a flat plate with a central hole and a pipe projecting up from the hole, whereby the length of the pipe need only be so great that the jacket can be tightened sealingly round it.

As illustrated in FIG. 3 there may be provided on top of the cooking vessel a standard, second lid 90, i.e. a lid in the form of a substantially flat plate and without a central hole. The second lid may have a gripping handle 92 whose outer diameter is less than the inner diameter of the pipe 62.

On top of this second lid 90 there may be provided a first lid 50 of the above-mentioned type. The advantage of the arrangement of the second lid 90 is that the hot steam from the food which is being heated in the cooking vessel does not flow directly out through the pipe 62. In this case the hot combustion gases flow radially inwards between the first and the second lids 50, 90 and then out through the pipe 62, without being mixed with the steam over the food in the cooking vessel.

What is claimed is:

1. A cooking apparatus comprising:

a burner (2), an upwardly extending cylindrical casing (10) in a lower part of which is a radially inwardly projecting, first contact portion (12) and in an upper part is a first edge (34), a cylindrical cooking vessel (40) which has a bottom (42), a side wall (44) which extends upwardly from the bottom (42), and in an upper part is a radially outwardly projecting, second contact portion (46), the bottom (42) and the side wall (44) defining a space (82) in the vessel (40), and a lid (50) with a peripheral portion (54) which is arranged to rest on the cooking vessel's (4) second contact portion (46), the casing's (10) first contact portion (12) is arranged to rest on the burner (2), and the casing (10) is arranged to enclose the cooking vessel's (40) side wall such that between the casing (10) and the cooking vessel (40) there is formed a gap (48), the cooking vessel's (40) second contact portion (46) is arranged to abut against the casing's (10) first edge (34), and at the point where the cooking vessel's (40) second contact portion (46) abuts against the casing's (10) first edge (34) there are provided radially extending openings (32) via which the gap (48) can communicate with a space (80) outside the casing (10) when the cooking vessel (40) is disposed in the casing (10), characterized in that the lid (50) has a hole (60) via which the space (82) in the cooking vessel (40) can communicate with a space above the lid (50), and between the peripheral portion (54) of the lid (50) and the second contact portion (46) of the cooking vessel (40) there extend passages (66) via which the space (80) outside the casing (10) can communicate with the space (82) in the cooking vessel (40) when the lid (50) is placed on the cooking vessel (40), and the cooking apparatus further comprises a tubular jacket (70) made of a fireproof, flexible material, which is arranged to extend over the lid (50) with clearance relative to and outside the casing (10), and which has a lower opening (72) whose edge is arranged to sealingly enclose a lower portion of the casing (10) and a upper opening (74) whose edge is arranged for sealing connection with an edge of the lid's hole (60).

2. The cooking apparatus according to claim 1, characterized in that the lid (50) is in the form of an upwardly open vessel with a bottom (52) and extending from a circumferential portion thereof is a cylindrical side wall (56) with a second upper edge (58), where the hole (60) is provided in the bottom (52) and from the hole (60) there extends upwardly a pipe (62) connected with the bottom (52) sealingly round the hole (60), a length of which pipe is at least as great as a height of the lid's side wall (56), and the bottom (52) comprises the peripheral portion (54) which is arranged to abut against the cooking vessel's (40) second contact portion (46), the edge of the jacket's (70) upper opening (74) being arranged to sealingly enclose an upper portion of the pipe (62).

3. The cooking apparatus according to claim 2, characterized in that at the point where the cooking vessel's (40) second contact portion (46) abuts against the casing's (10) first edge (34), the openings (32) are provided in the casing (10).

4. The cooking apparatus according to claim 1, characterized in that at the point where the cooking vessel's (40) second contact portion (46) abuts against the casing's (10) first edge (34), the openings (32) are provided in the casing (10).

5. The cooking apparatus according to claim 1, characterized in that the jacket (70) is made of a fabric of insulative material.

6. The cooking apparatus according to claim 5, wherein the fabric is coated with aluminum on one or both sides.

7. The cooking apparatus according to claim 5, wherein the fabric is made of glass.

8. The cooking apparatus according to claim 5, wherein the fabric is made of a synthetic fiber.

9. The cooking apparatus according to claim 1 further comprising a securing device (26,28,30) for releasable interconnection of the casing (10) and the burner (4).

10. The cooking apparatus according to claim 9, characterized in that the securing device (26,28,30) comprises a wire hoop with ends (14,16,22,24) which may be brought into releasable engagement with respective holes in the lower portion of the casing (10), which wire hoop grips under a downwardly facing flange of the burner, pressing it upwards to abut against the casing.

11. The cooking apparatus according to claim 1, characterized in that along the edges of each of the jacket's (70) openings (72,74) there is provided a sewn fold wherein there is threaded a string.

* * * * *